(12) United States Patent
Parker et al.

(10) Patent No.: US 8,444,228 B2
(45) Date of Patent: May 21, 2013

(54) WHEEL ASSEMBLY FOR TRASH/RECYCLING CART

(75) Inventors: Brian G. Parker, Alto, MI (US); Michael R. Featherstone, Constantine, MI (US); Linda R. Umlor, Grandville, MI (US)

(73) Assignee: Cascade Engineering, Inc., Grand Rapids, MI (US)

( * ) Notice: Subject to any disclaimer, the term of this patent is extended or adjusted under 35 U.S.C. 154(b) by 421 days.

(21) Appl. No.: 12/893,386

(22) Filed: Sep. 29, 2010

(65) Prior Publication Data

US 2012/0074663 A1    Mar. 29, 2012

(51) Int. Cl.
*B60B 37/10* (2006.01)

(52) U.S. Cl.
USPC ............. 301/111.04; 301/111.03; 301/111.07

(58) Field of Classification Search
CPC ....................................................... B60B 37/10
USPC ............. 301/111.01, 111.03, 111.04, 111.05, 301/111.07, 112, 120, 121, 122, 124.2; 295/47
See application file for complete search history.

(56) References Cited

U.S. PATENT DOCUMENTS

| 5,188,430 | A | * | 2/1993 | Chiu ........................ 301/111.01 |
| 5,215,356 | A | * | 6/1993 | Lin ........................... 301/111.07 |
| D353,571 | S | | 12/1994 | Braungart et al. |
| 5,494,340 | A | * | 2/1996 | Cheng ........................ 301/111.07 |
| 5,716,107 | A | * | 2/1998 | Parker et al. ............. 301/111.07 |
| D398,898 | S | | 9/1998 | Baumgartner et al. |
| D405,409 | S | | 2/1999 | Baumgartner |
| D406,092 | S | | 2/1999 | Baumgartner |
| 6,637,835 | B2 | | 10/2003 | Morris |
| 6,666,526 | B1 | * | 12/2003 | Cummins ...................... 301/112 |
| 6,910,742 | B2 | * | 6/2005 | Flood et al. .................... 301/119 |
| 6,938,964 | B2 | * | 9/2005 | Flood et al. .................... 301/119 |
| D541,202 | S | | 4/2007 | Baumgartner |
| D542,003 | S | | 5/2007 | Morris |
| 7,377,597 | B2 | | 5/2008 | Morris |
| 7,390,068 | B2 | * | 6/2008 | Smith et al. ................... 301/113 |
| 7,445,297 | B2 | * | 11/2008 | Mercier et al. ........... 301/111.04 |
| 7,591,592 | B2 | * | 9/2009 | Beirne et al. ................... 384/295 |

FOREIGN PATENT DOCUMENTS

FR    2808243  A1  * 11/2001

* cited by examiner

*Primary Examiner* — Kip T Kotter
(74) *Attorney, Agent, or Firm* — Warner Norcross & Judd LLP (57) ABSTRACT

A wheel assembly that may be installed on, and removed from, an axle without the need for tools. The wheel assembly includes a wheel, at least one clip supported by the wheel, and a cover securing the clip in position. The wheel assembly is mountable on an axle including a circumferential groove and is retained on the axle by the extension of the clip into the groove. The clip includes an actuator arm extending away from the plane of the wheel so as to be readily accessible for actuation by one's fingers. Actuation of the arm withdraws the clip from the groove to release the wheel from the axle. Preferably two clips are provided diametrically opposite one another, enabling both arms to be actuated simultaneously in a pinching operation.

4 Claims, 8 Drawing Sheets

WHEEL ASSEMBLY FOR TRASH/RECYCLING CART

BACKGROUND OF THE INVENTION

The present invention relates to a wheel assembly for a trash/recycling cart, and more particularly to a wheel assembly that is easily installed and removed in the field.

Rollable carts for containing trash, recyclables, lawn and garden clippings, and other materials are well known. These carts may be transported or "wheeled" relatively easily even when the cart is filled. The wheeled carts facilitate periodic transportation of the cart to the curb or other area for pick-up/emptying, as well as transportation of the cart to the material to be picked up.

It is desirable that the wheels may be easily installed on and removed from the carts in the field. For example, the carts typically are initially shipped for deployment without the wheels installed, enabling the carts to be stacked. During deployment, the carts are unstacked, and the wheels are installed. The carts may also be unstacked, moved to another area and restacked to facilitate higher moving densities. During use, occasionally the wheels will break or become wholly or partially detached from the cart. It is desirable that the wheels be readily removable and installable so that damaged wheels can be readily replaced in the field.

There are a variety of wheel assemblies enabling the wheels to be installed on and removed from the carts. One particularly successful wheel assembly is disclosed in U.S. Pat. No. 5,716,107 issued Feb. 10, 1998 to Parker et al. This wheel assembly includes a wheel, a wheel retainer, and a cover. The wheel retainer is resiliently flexible and includes a pair of keepers biased into a circumferential groove in the axle. When the keepers are in the axle groove, the keepers retain the wheel on the axle. The keepers may be forced out of the axle groove using a special tool to release the wheel assembly from the axle, enabling the wheel assembly to be removed and replaced. Unfortunately, servicing the wheel assembly requires the special tool. If the tool is lost or misplaced, removing the wheel assembly is difficult, resulting in wasted crew time while a replacement tool is obtained.

Other cart wheel assemblies are disclosed in U.S. Pat. No. 6,637,835 issued Oct. 28, 2003 to Morris and U.S. Pat. No. 7,377,597 issued May 27, 2008 to Morris. Unfortunately, both of these wheel assemblies are relatively complex sleeves, are difficult to assemble, and do not retain the wheel assembly on the axle with the desired consistency. The wheel assemblies require tools for removal. The wheel assemblies sometimes result in undesired noise because the wheel sometimes "chirps" as it rotates on the axle. Finally, the metal spring clip disclosed in the '597 patent can corrode, which can result in spring failure.

As a result of the success of the above-noted wheel assemblies, literally millions of the axles disclosed in those patents have been manufactured over the years and remain in active carts. In order to be "backward compatible" for servicing wheel assemblies in the field, it is desirable that future wheel assembly designs be compatible with that axle.

SUMMARY OF THE INVENTION

The afore-mentioned issues are addressed by the present invention, in which a wheel assembly is provided that may be installed on and removed from a conventional axle without the need for tools—special or otherwise. The wheel assembly includes a wheel supporting at least one clip, which in turn includes a keeper extending into the circumferential groove in the axle. The clip further includes an actuator extending away from the plane of the wheel, enabling the actuator to be readily accessed and actuated by one's fingers to withdraw the keeper from the groove, and thereby release the wheel assembly from the axle.

In the current embodiment, a cover may be releasably secured to the hub and may engage the clip to retain the clip in position axially while permitting radial movement of the engagement tab into and out of the groove during installation and removal of the wheel on the axle.

The present invention is believed to have advantages over known constructions. First, the device secures the wheel assembly on the axle with improved consistency. Second, the device provides an audible sound or "click" as the wheel is moved into operative position on the axle. Third, the retaining mechanism may be quickly and easily released without the need for tools. Fourth, the device does not produce the "chirping" or "squeaking" noise during operation that is commonly associated with some other designs.

These and other advantages and features of the invention will be more fully understood and appreciated by reference to the description of the current embodiments and the drawings.

DESCRIPTION OF THE CURRENT EMBODIMENTS

Figure 11:
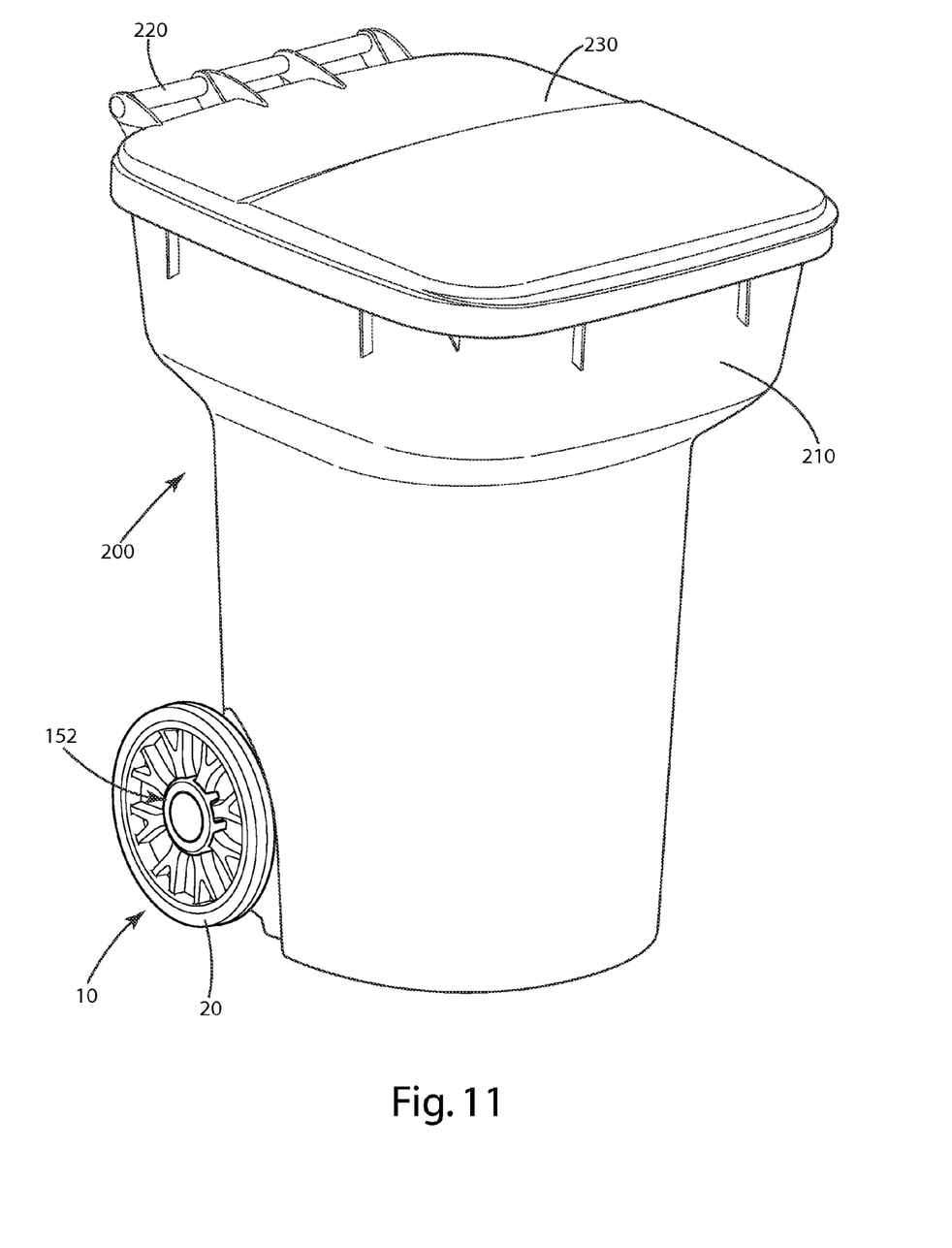
FIG. 11 is a perspective view of a trash/recycling cart assembly including the wheel assembly.

A trash/recycling cart of a type generally known to those skilled in the art is illustrated in FIG. 11 and generally designated 200. Cart assembly 200 is an example of the type of cart that may incorporate a wheel assembly constructed in accordance with the current embodiment of the invention. Cart assembly 200 includes a cart body 210 including an integral handle 220, a lid 230 hinged on the cart body, and a pair of wheel assemblies 20 on opposite sides of the cart body 210.

A wheel assembly constructed in accordance with the current embodiment of the invention is illustrated in FIGS. 1-10 and generally designated 10. The assembly 10 includes a wheel 20, a retainer clip 30, a hub 80, a cover or hub cap 150, and an axle 170. In this application the direction "radially outward" and "radially inward" are in reference to the central axis of axle 170 in the final assembly. The assembly 10 is shown in the figures and described with two clips 30, but the assembly 10 may include only one clip 30 or may include more than two clips 30.

Figure 1:
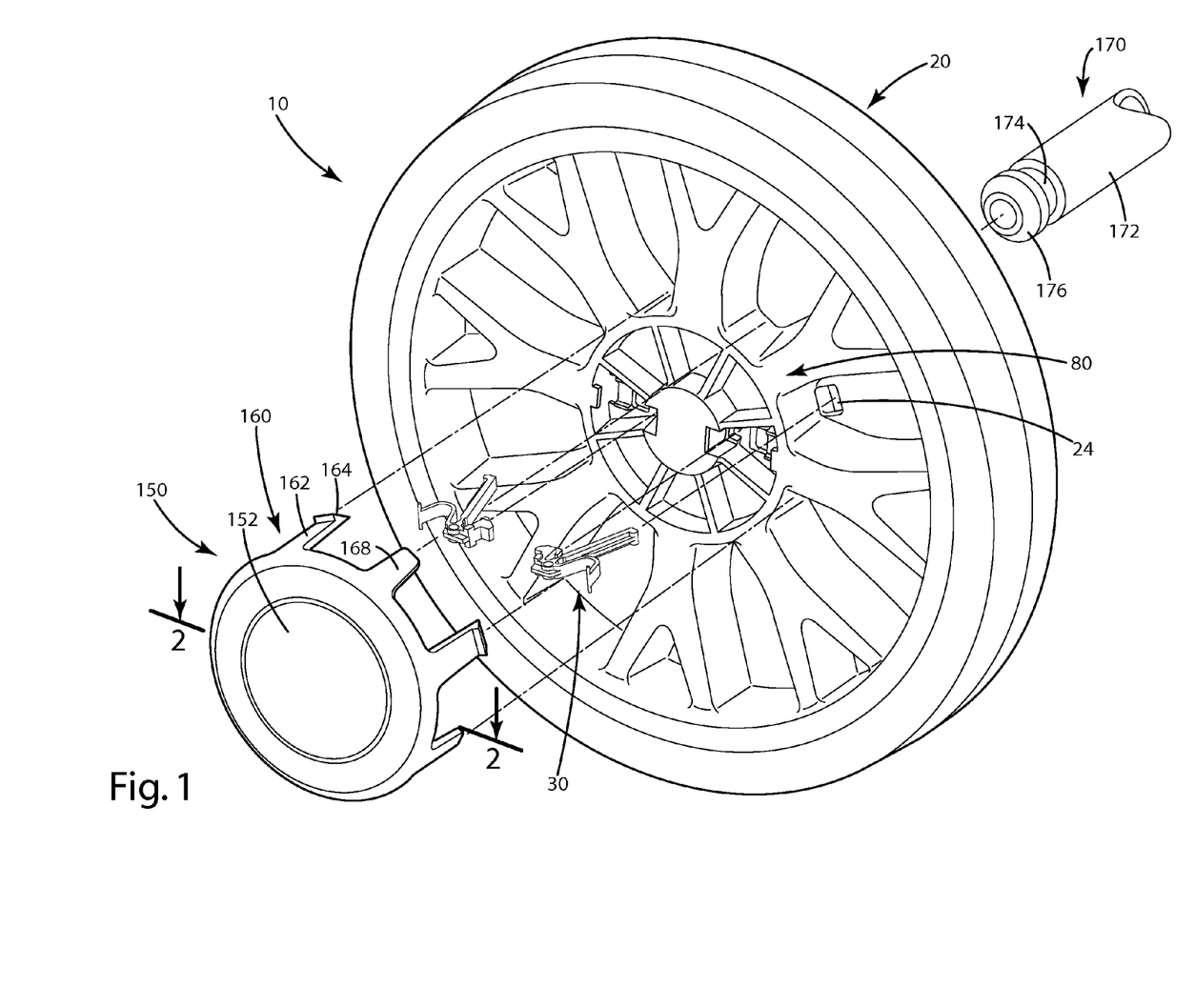
FIG. 1 is an exploded perspective view of the current embodiment of the invention.
Figure 2:
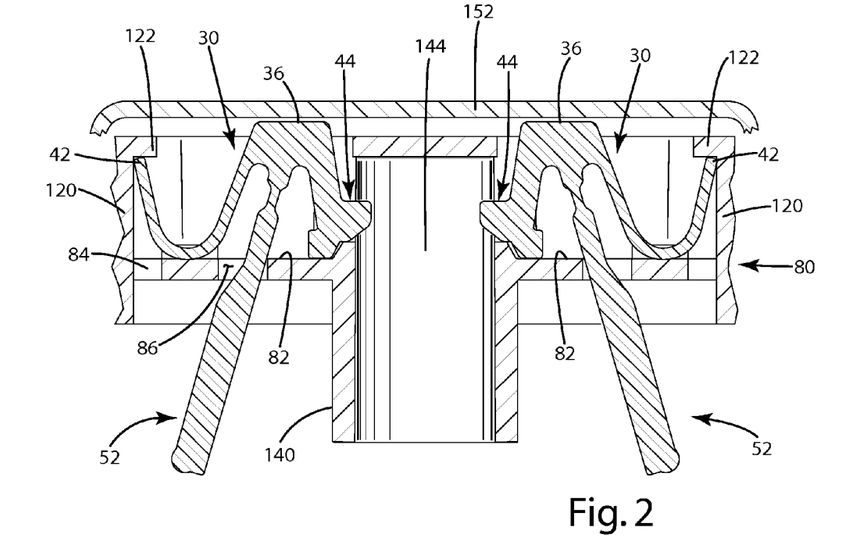
FIG. 2 is a sectional view taken along line 2-2 in FIG. 1 before the wheel assembly is installed on the axle.

The wheel 20 defines apertures 24 that receive cover 150. As shown in FIG. 1, the wheel 20 and hub 80 may be integrally formed with one another. Wheel 20 and hub 80 may also be separately formed and attached to one another. In a non-integral configuration, the wheel 20 may define an aperture into which hub 80 may be inserted and secured. In an integral configuration, the wheel 20 may be molded with hub 80 such that the wheel 20 and hub 80 are constructed from one homogeneous material and formed during one step of a manufacturing process. For example, the wheel 20 and hub 80 may be formed together by injection molding. The wheel 20 and hub 80 may be made of any suitable material including metals, plastics and composites. In an integral configuration, the wheel 20 and hub 80 may also be constructed from different materials during different steps of a manufacturing process, for example, during a two-stage injection molding process in which two different materials are injected. Wheel 20 and hub 80 may be manufactured by any process suitable for the application including injection molding, compression molding and machining.

Figure 7:
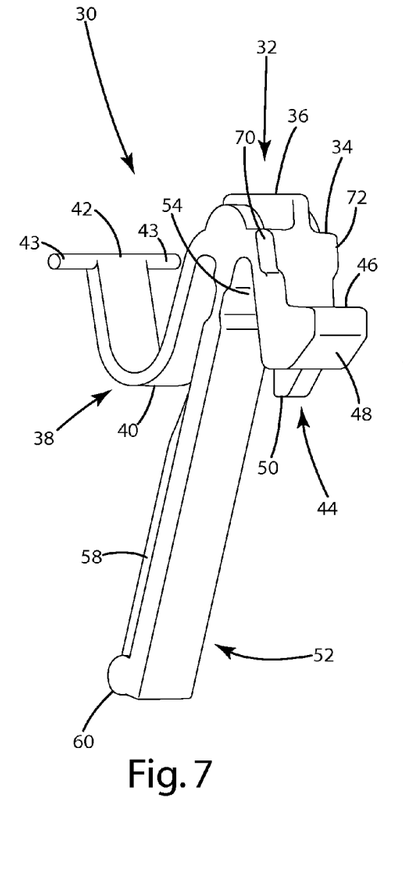
FIG. 7 is a perspective view of the clip.
Figure 8:
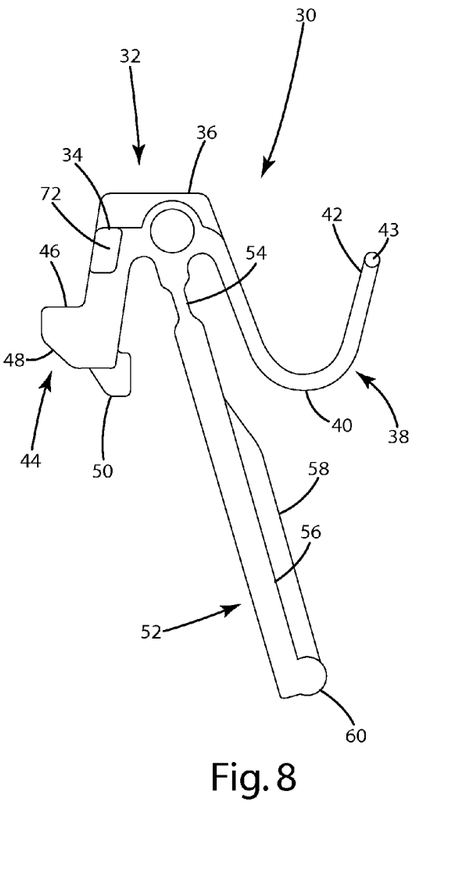
FIG. 8 is a side view of the clip.

As shown in FIGS. 7-8, the clip 30 includes a top end 32, an arm or spring 38, an engagement tab or keeper 44 and a lever or actuator 52. Top end 32 includes a top surface 34 and a top edge 36 protruding from top surface 34. Arm 38 extends radially outward from top end 32 and includes a curved member 40 and an arm end 42. Two arm pegs 43 extend outward from arm end 42. Engagement tab 44 extends radially inward from top end 32 in a direction opposite arm 38 and includes a flat engagement surface 46, a tapered engagement surface 48, and locating bosses 50, 70, 72. Lever 52 extends from top end 32 and is positioned between arm 38 and engagement tab 44. Lever 52 includes a thinned section 54, a lever surface 56, a rib 58 and a rounded portion 60. Thinned section 54 acts as a pivot and allows lever 52 to move radially inward and radially outward. Rib 58 protrudes from lever surface 56 and strengthens lever 52 to preserve the substantially straight shape of lever 52 while lever 52 is moved radially inward and radially outward. Rounded portion 60 is located at the end of lever 52 and may improve the tactile feel to a user when engaging lever 52. Clip 30 may be made of any suitable material including metals, plastics and composites. Clip 30 may be manufactured by any process suitable for the application including injection molding, compression molding and machining.

Figure 9:
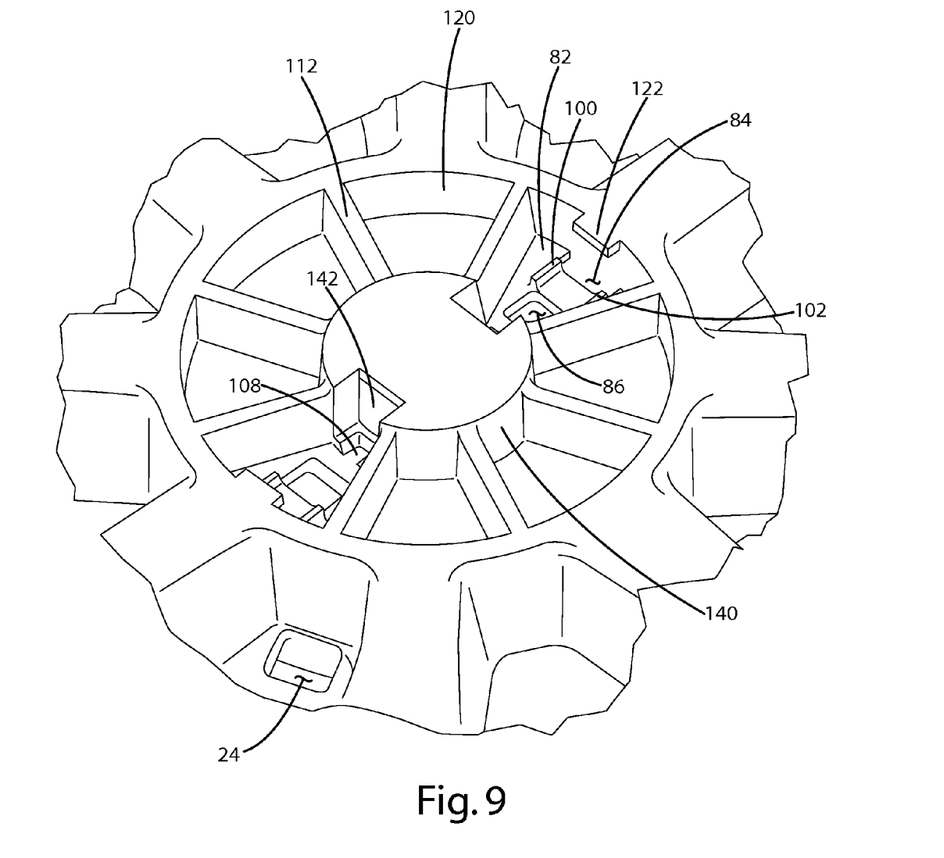
FIG. 9 is a perspective view of the wheel hub without the clips installed.
Figure 10:
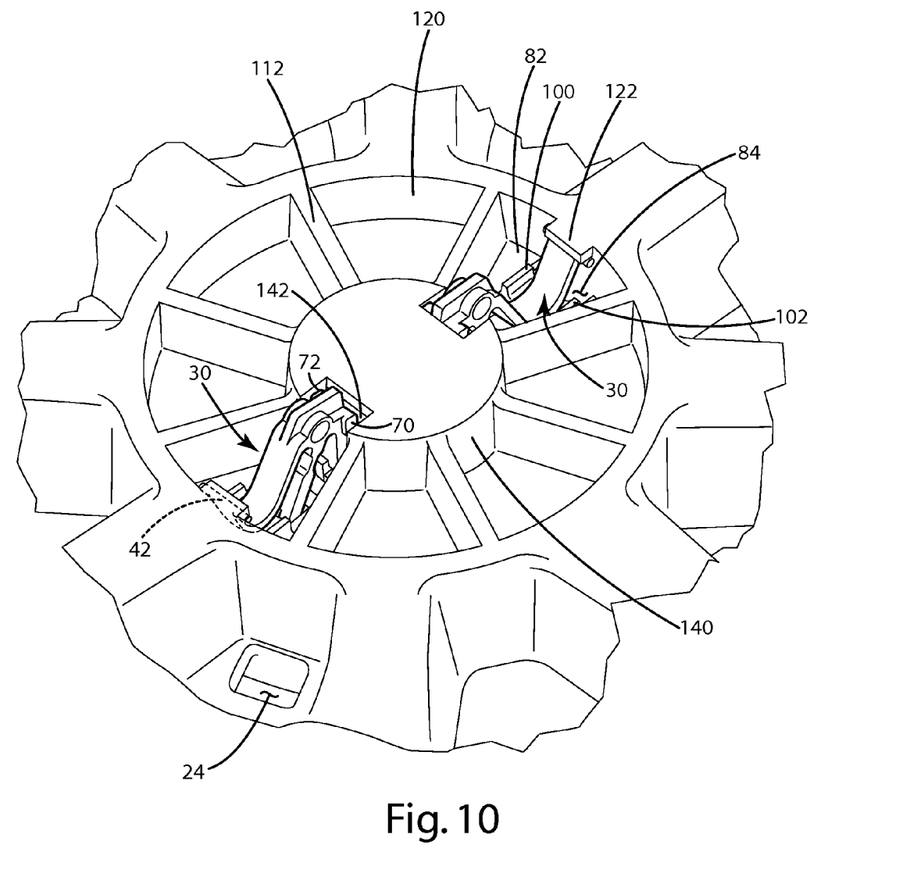
FIG. 10 is a perspective view of the wheel hub with the clips installed.

As shown in FIGS. 9-10, hub 80 includes surface 82, outer cylinder 120 and inner cylinder 140. For ease of description, only one side of hub 80 may be numbered or described, but it is to be understood that the opposing side of hub 80 is a minor-image of the side numbered or described. FIGS. 9-10 show the hub 80 with two clips 30. If more than two clips 30 are used, hub 80 may include spaces for the clips 30 positioned at equal angles about the central axis of inner cylinder 140 to increase the stability of the wheel assembly 10. To conserve cost and material, only one clip 30 may be used. Inner cylinder 140 may be various diameters to accommodate various diameters of axles 170.

Surface 82 may support clip 30. More specifically, curved member 40 may contact surface 82. Surface 82 defines apertures 84, 86. Apertures 84 may be positioned to provide access to form support tabs 122 during the manufacturing process, for example, during injection molding. Apertures 86 receive levers 52. Guide bosses 100, 102 extend from surface 82 and retain clip 30 in a proper position. More specifically, curved member 40 may contact surface 82 in a location between guide bosses 100, 102. Locating notches 108 are located adjacent surface 82 and receive locating boss 50 to further retain clip 30 in a proper position. The hub 80 includes ribs 112 extending from outer cylinder 120 to inner cylinder 140, which strengthen hub 80. Support tabs 122 extend inwardly from outer cylinder 120 and interact with arm ends 42 and arm pegs 43 to further retain clip 30 in a proper position. Inner cylinder 140 defines apertures 142, which receive engagement tabs 44. As shown in FIGS. 2-6, inner cylinder 140 also defines a bore 144, which receives axle 170. Locating bosses 70, 72 may interface with the sides of apertures 142 to further properly position clip 30. Arm 38 may contact support tabs 122 and the inner surface of outer cylinder 120 to bias engagement tab 44 radially inward toward apertures 142. The potential materials and processes for making hub 80 are described above.

Cover 150 is shown in FIG. 1 and includes a flat section 152, locking cover sections 160 and non-locking cover sections 168. Locking cover sections 160 extend substantially perpendicularly from flat section 152 and include side tabs 162 and locking detents 164. Locking detents 164 may be inserted into wheel apertures 24 to releasably secure cover 150 to wheel 20. Cover 150 may be made of any suitable material including metals, plastics and composites. Cover 150 may be manufactured by any process suitable for the application including injection molding, compression molding and machining.

Figure 4:
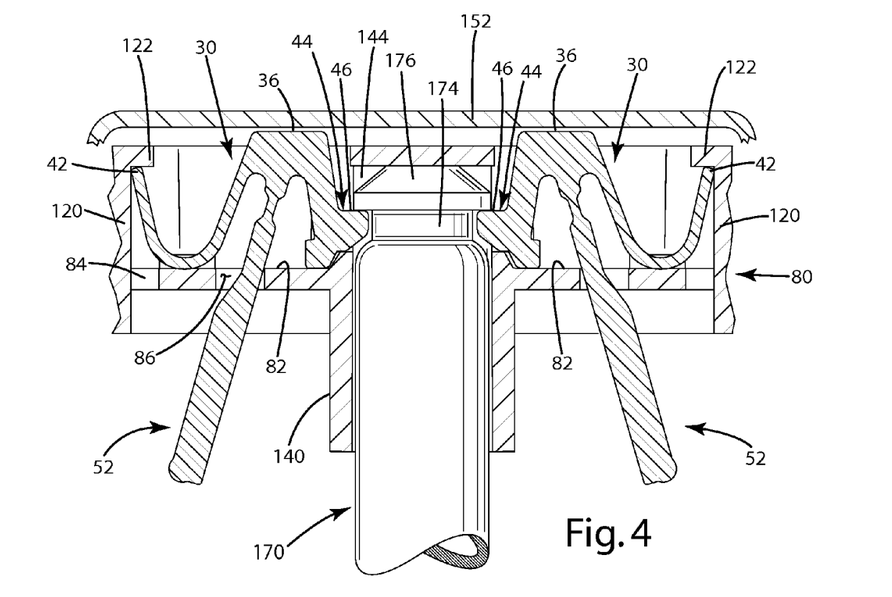
FIG. 4 is a sectional view similar to FIG. 2 showing the wheel assembly fully installed on the axle.

Axle 170 is shown in FIG. 1 and includes a substantially cylindrical body 172, a circumferential channel, notch or groove 174 defined in cylindrical body 172 and a tapered end 176. As shown in FIG. 4, channel 174 receives engagement tabs 44 of clip 30. Axle 170 may be solid or hollow and may be made of any material suitable for the application, including cast iron, steel, aluminum, plastics, other metals and composites. Axle 170 may be manufactured by any process suitable for the application including forging, injection molding, compression molding and machining.

Assembly and Operation

To assemble wheel assembly 10, hub 80 may be secured within wheel 20 using any fastening method suitable for the application including manual fasteners and adhesives. As described above, hub 80 may also be integrally formed with wheel 20, which would require no additional fastening of hub 80 to wheel 20. Clips 30 may be inserted into hub 80 such that levers 52 are placed into apertures 86 in surface 82 of hub 80. Arms 38 may be compressed towards levers 52 such that clips 30 may be inserted into proper position within hub 80. In this position, arm ends 42 and arm pegs 43 may interface with support tabs 122, curved portions 40 may interface with surface 82 in a location between guide bosses 100, 102, locating bosses 50 may interface with locating notches 108 and engagement tabs 44 may be positioned within apertures 142 and extend through inner cylinder 140 into bore 144. Locating bosses 70, 72 may interface with the sides of apertures 142 to properly position clips 30. This orientation is shown in FIG. 10.

Figure 3:
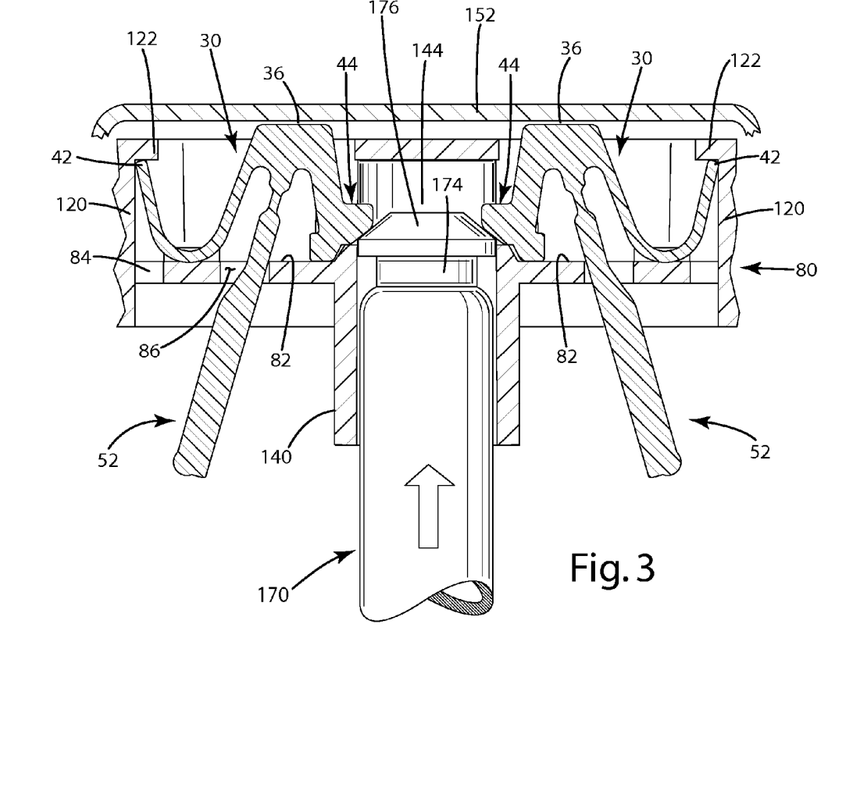
FIG. 3 is a sectional view similar to FIG. 2 showing the wheel assembly partially installed on the axle.

Cover 150 may be attached to hub 80 by inserting locking detents 164 into wheel apertures 24. Bore 144 may be aligned with and fit over axle 170 until tapered engagement surfaces 48 engage tapered end 176 of axle 170, as shown in FIG. 3. As bore 144 of hub 80 is further positioned onto axle 170, the interaction between tapered engagement surfaces 48 and tapered end 176 forces engagement tabs 44 radially outward from axle 170. During the movement of hub 80 onto axle 170, the friction between tapered engagement surfaces 48 and tapered end 176 may cause tapered engagement surfaces 48 to resist the desired outward radial movement of engagement tabs 44 and instead remain stationary with respect to axle 170. This action may cause top edges 36 to also remain stationary with respect to axle 170 during further insertion of hub 80 onto axle 170. To encourage tapered engagement surfaces 48 to continue to move over tapered end 176 and produce the desired outward radial movement of engagement tabs 44, flat section 152 of cover 150 may engage top edges 36 of clips 30. As shown in FIG. 4, when hub 80 is positioned onto axle 170 such that flat engagement surfaces 46 of clips 30 are aligned with channel 174, engagement tabs 44 snap into channel 174, which may produce an audible click. This audible click may assist in manufacturing, as the person or machinery assembling the wheel assembly 10 may use the click as an indication that hub 80 is fully inserted onto axle 170. Once engagement tabs 44 are positioned within channel 174, hub 80 is retained on axle 170 and the wheel assembly 10 may be used.

Figure 5:
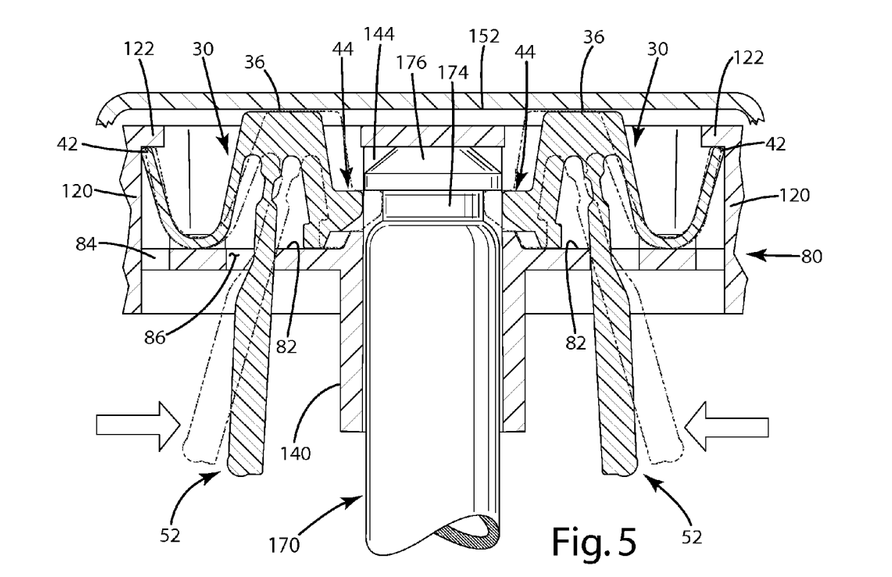
FIG. 5 is a sectional view similar to FIG. 2 showing the clips withdrawn from the axle groove.
Figure 6:
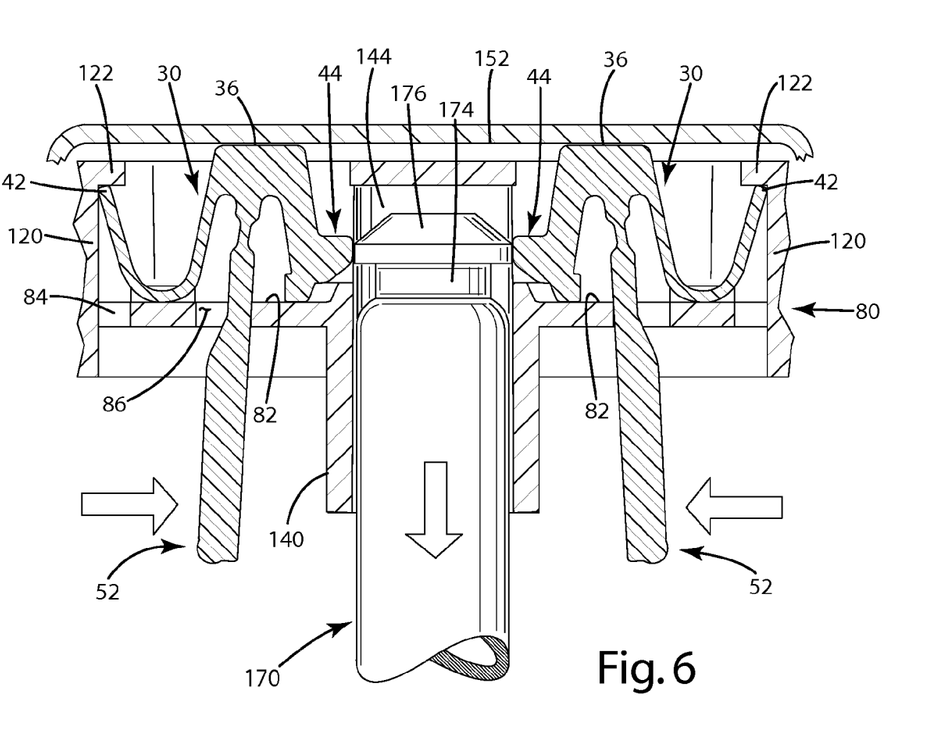
FIG. 6 is a sectional view similar to FIG. 2 showing the wheel partially removed from the axle.

To remove wheel 20 from axle 170, a user may engage rounded ends 60 of levers 52 to move levers 52 radially inward toward axle 170, as shown in FIG. 5. Levers 52 may move engagement tabs 44 radially outward away from channel 174. As shown in FIG. 6, once engagement tabs 44 are removed from channel 174 such that engagement tabs 44 may be moved past tapered end 176 of axle 170, hub 80 may be released from axle 170. It may not be required that engagement tabs 44 be completely removed from channel 174 before hub 80 is released from axle 170. For example, if engagement tabs 44 are partially removed from channel 174, the force used to remove hub 80 from axle 170 may be sufficient to force engagement tabs 44 radially outward to allow release of hub 80 and wheel 20 from axle 170.

The above descriptions are those of the current embodiments of the invention. Various alterations and changes can be made without departing from the spirit and broader aspects of the invention as defined in the appended claims, which are to be interpreted in accordance with the principles of patent law, including the doctrine of equivalents.

The embodiments of the invention in which an exclusive property or privelege is claimed are defined as follows:

1. A wheel assembly adapted for mounting on an axle having a circumferential groove, the wheel assembly comprising:
   a wheel defining a bore adapted to fit over the axle;
   first and second clips supported directly by the wheel, each clip including an engagement tab adapted to fit into the axle groove, each clip further including a spring urging the engagement tab into the bore, each clip further including an actuator extending laterally from the wheel and readily accessible by one's fingers, the actuators of the first and second clips being simultaneously engageable and moveable toward one another in a pinching action of one's fingers, movement of the actuators resulting in movement of the engagement tabs: and
   a hub cap mounted on the wheel and retaining the first and second clips in position.

2. A cart comprising:
   a cart body;
   an axle supported by the cart body, at least one end of the axle defining a circumferential groove;
   a wheel assembly including a wheel and first and second retainer clips, the wheel mounted on the axle and supporting the first and second retainer clips, each retainer clip including an engagement tab and a spring urging the engagement tab at least partially into the axle groove, each retainer clip further including an actuator extending laterally from the wheel and readily accessible using one's fingers, the actuators of the first and second clips positioned diametrically opposite one another across the axle so as to be simultaneously engageable and movable in a pinching action of one's fingers, the actuators being movable against the force of the springs to withdraw the engagement tabs from the groove; and
   a hub cap secured to the wheel and retaining the retainer clips in position on the wheel.

3. A wheel assembly for a cart comprising:
   a wheel, the wheel defining a bore;
   an axle capable of fitting within the bore, the axle including a body and a circumferential channel defined by the body;
   first and second clips attached to the wheel, each clip including an arm, an engagement tab and an actuator, each actuator being a lateral member extending from the wheel, each arm engaging the wheel and biasing the associated engagement tab into the channel, each actuator readily accessible to a user such that the user may move the engagement tab away from the channel by moving the actuator toward the axle with the user's fingers, the first and second clips located on opposing sides of the axle and allowing a user to remove the wheel from the axle by pressing the actuators toward one another with the user's fingers; and
   a cover mounted on the wheel, the cover engaging the clips during positioning of the axle within the bore.

4. The wheel assembly of claim 3 wherein the first and second clips are capable of producing an audible sound when the engagement tabs are first positioned into the channel.

* * * * *